(12) United States Patent
Eguchi

(10) Patent No.: US 8,730,586 B2
(45) Date of Patent: *May 20, 2014

(54) ZOOM LENS SYSTEM AND ELECTRONIC IMAGING APPARATUS PROVIDED WITH THE SAME

(71) Applicant: Hoya Corporation, Tokyo (JP)

(72) Inventor: Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,272

(22) Filed: Nov. 13, 2012

(65) Prior Publication Data

US 2013/0147992 A1   Jun. 13, 2013

(30) Foreign Application Priority Data

Dec. 7, 2011   (JP) .................................. 2011-267861

(51) Int. Cl.
   *G02B 15/14*   (2006.01)
   *H04N 5/225*   (2006.01)

(52) U.S. Cl.
   USPC ............................ 359/682; 359/680; 348/340

(58) Field of Classification Search
   CPC ...... G02B 15/14; G02B 15/16; G02B 15/177; G02B 15/20; H04N 5/225
   USPC ............................ 359/680, 682, 689; 348/340
   See application file for complete search history.

(56) References Cited

U.S. PATENT DOCUMENTS

| | | | |
|---|---|---|---|
| 6,654,180 B2 * | 11/2003 | Ori | 359/689 |
| 6,917,476 B2 | 7/2005 | Eguchi | |
| 6,972,908 B2 * | 12/2005 | Noda | 359/680 |
| 7,180,683 B2 * | 2/2007 | Mizuguchi et al. | 359/689 |
| 7,764,444 B2 | 7/2010 | Katakura | |
| 8,503,093 B2 * | 8/2013 | Kurashige et al. | 359/682 |
| 8,531,776 B2 * | 9/2013 | Peng et al. | 359/682 |
| 8,564,887 B2 * | 10/2013 | Yamasaki et al. | 359/682 |
| 2013/0176478 A1 * | 7/2013 | Eguchi | 348/345 |

FOREIGN PATENT DOCUMENTS

| | | |
|---|---|---|
| JP | 2004-258235 | 9/2004 |
| JP | 4189257 | 9/2008 |
| JP | 2009-037125 | 2/2009 |

OTHER PUBLICATIONS

U.S. Appl. No. 13/675,252 to Masaru Eguchi, filed Nov. 13, 2012.

* cited by examiner

*Primary Examiner* — David N Spector
(74) *Attorney, Agent, or Firm* — Greenblum & Bernstein P.L.C.

(57) ABSTRACT

A zoom lens system includes a negative first lens group, positive second and third lens groups, wherein upon zooming from the short to the long focal length extremities, the distance between the first and second lens groups decreases and the distance between the second and third lens groups changes. The second lens group includes a biconvex positive lens element with an aspherical surface on each side, and a negative meniscus lens element with an aspherical surface, and a concave surface on the image side. The following condition (1) is satisfied:

$$5 < m2t/m2w < 8 \qquad (1),$$

wherein m2t and m2w designate the lateral magnifications of the second lens group at the long and short focal length extremities, respectively, when focused on an object at infinity.

7 Claims, 16 Drawing Sheets

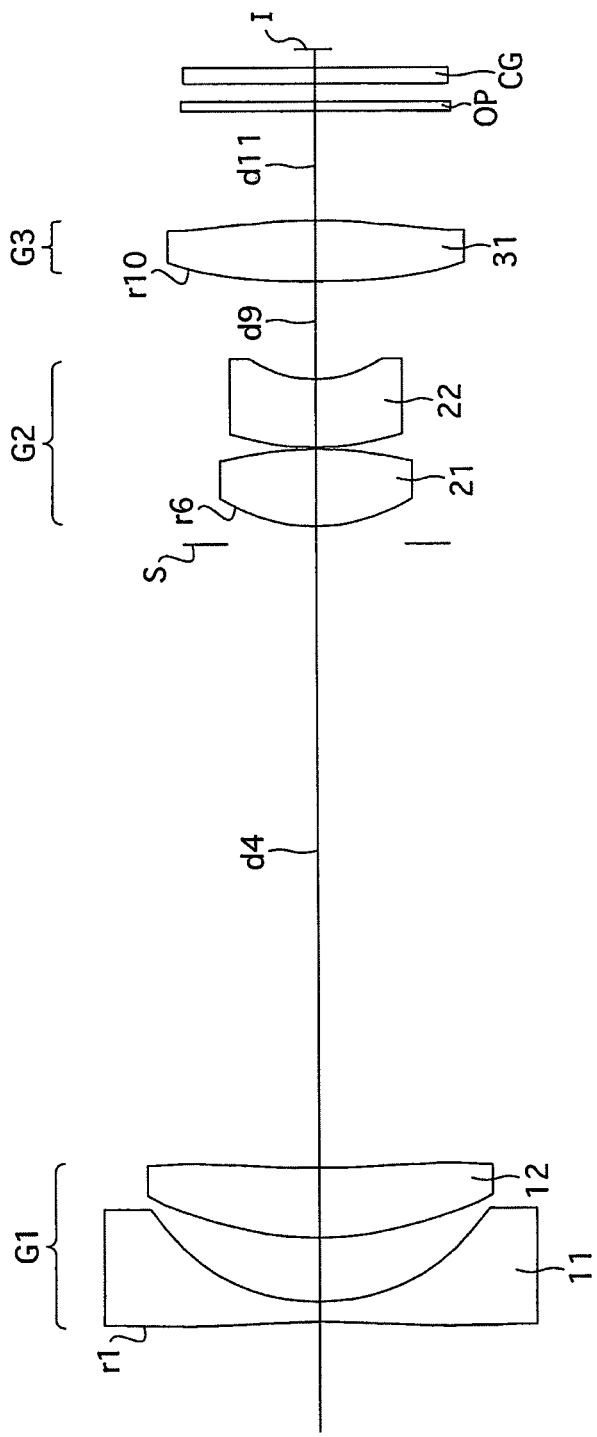

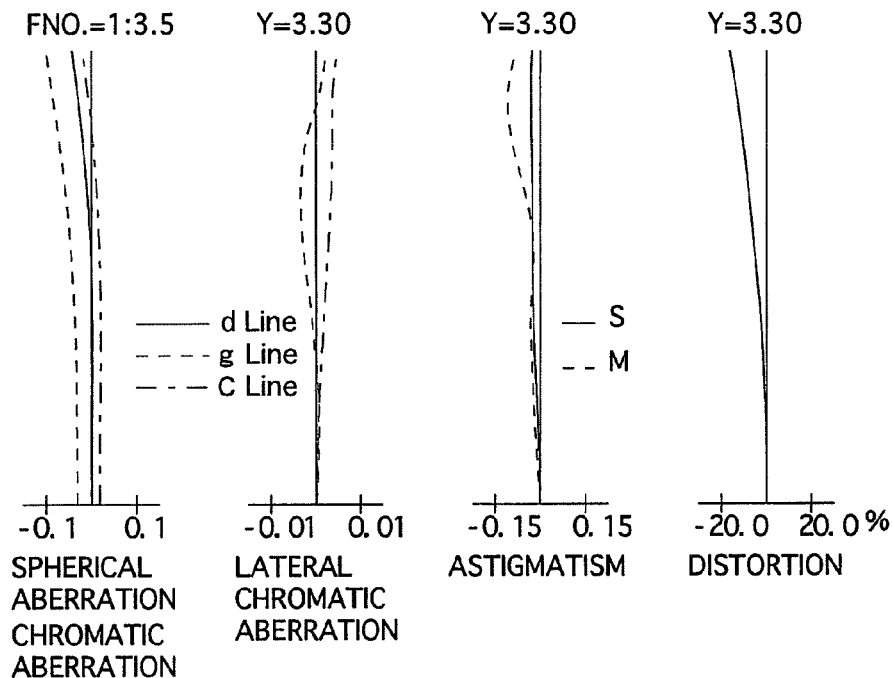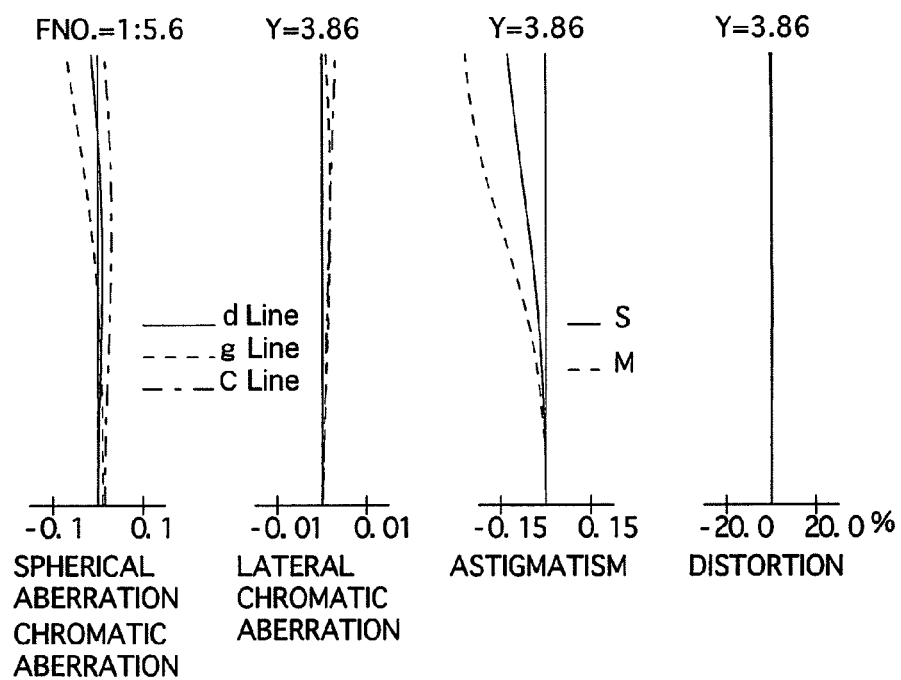

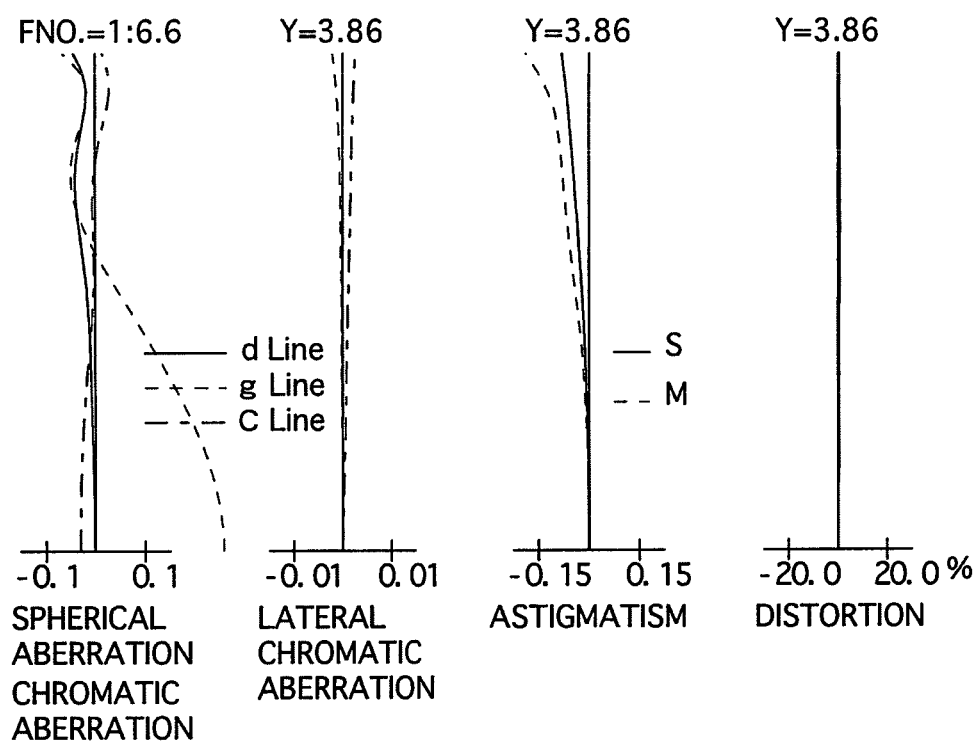

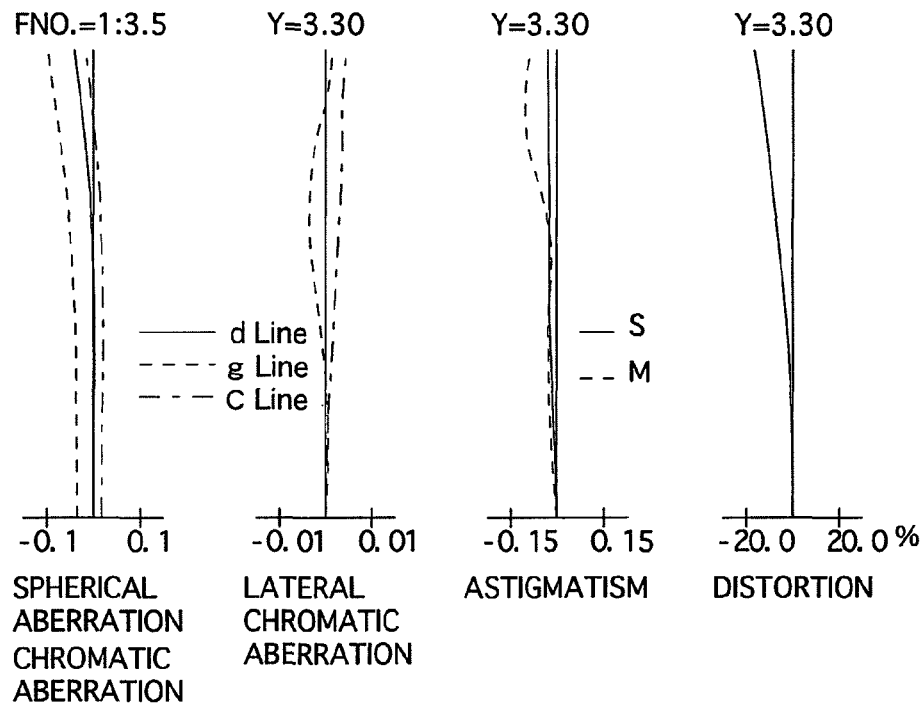
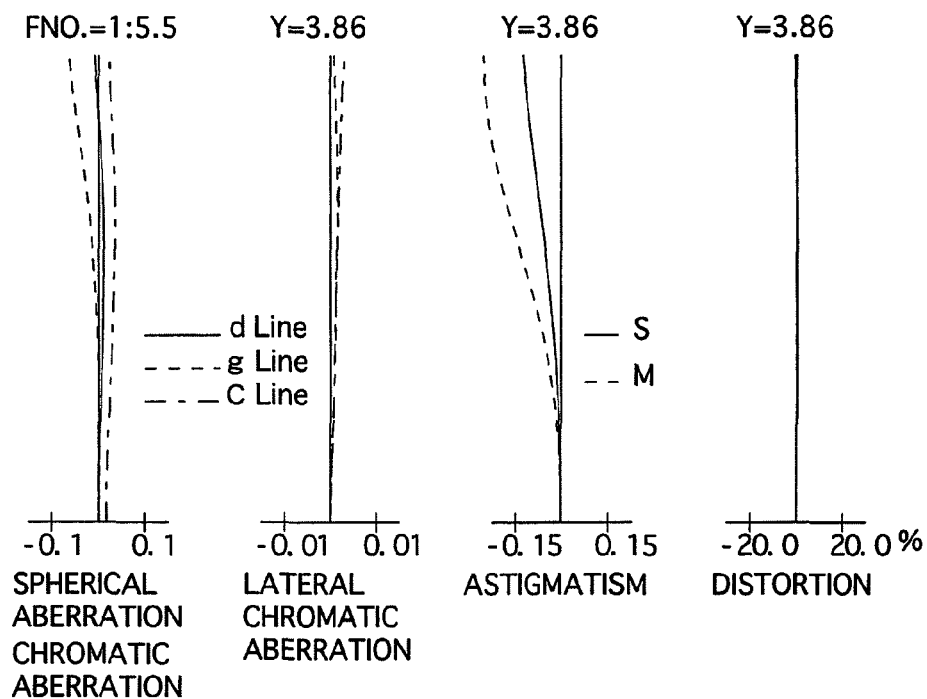

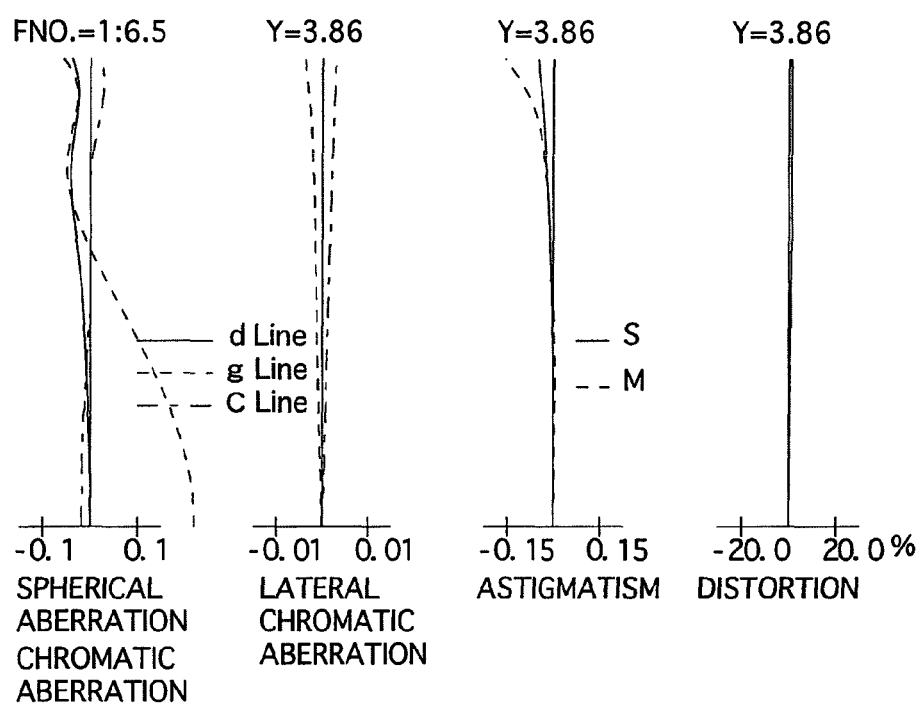

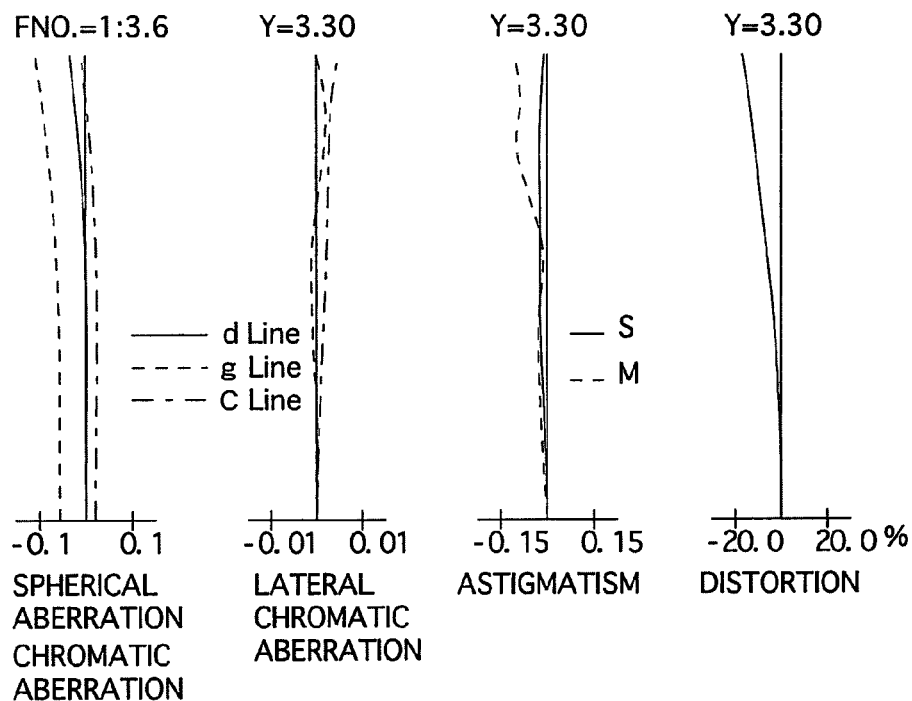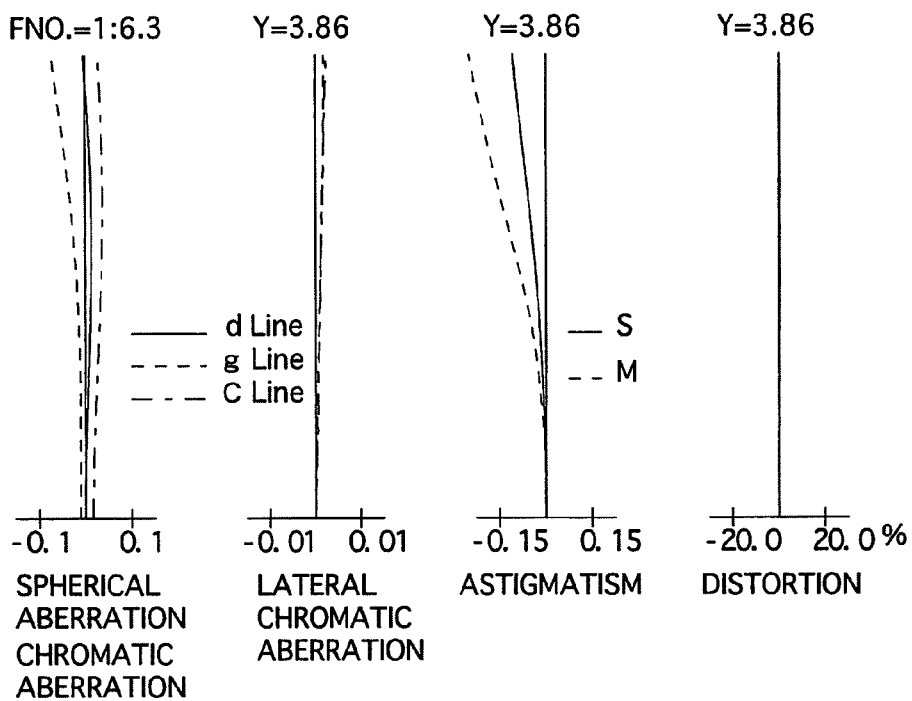

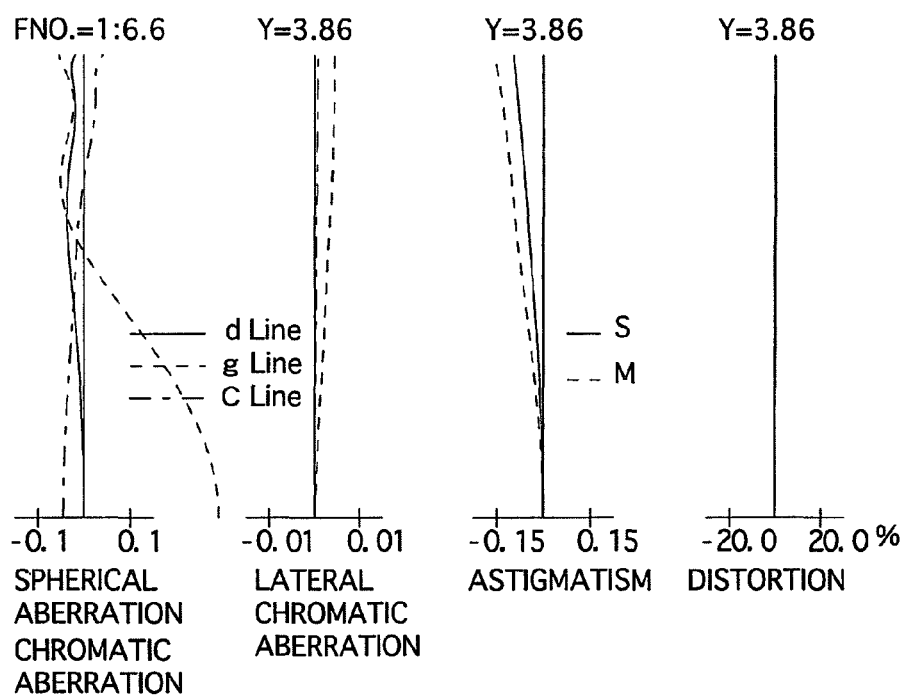

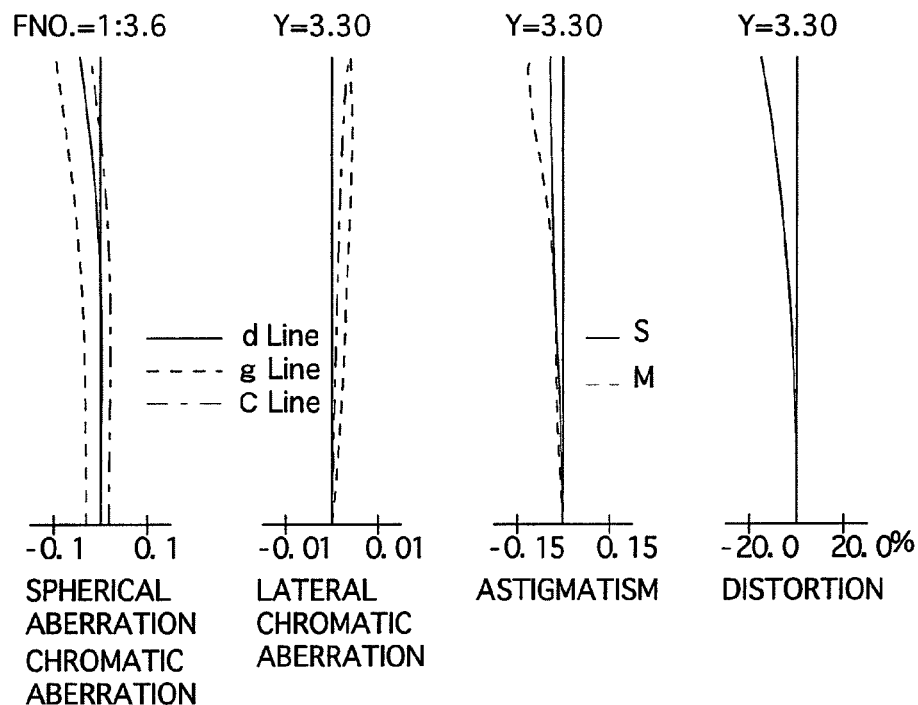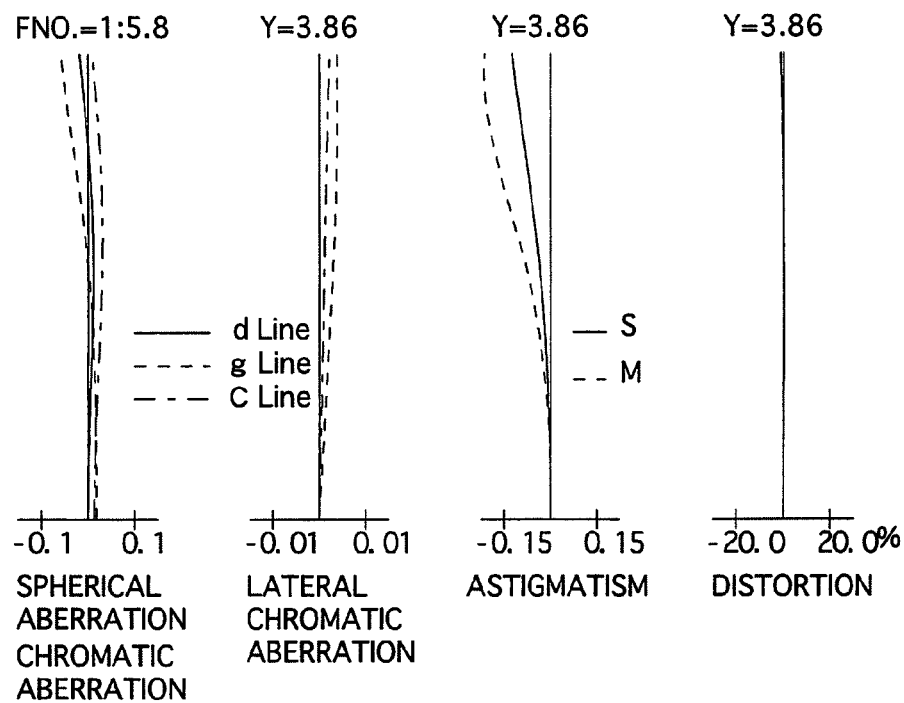

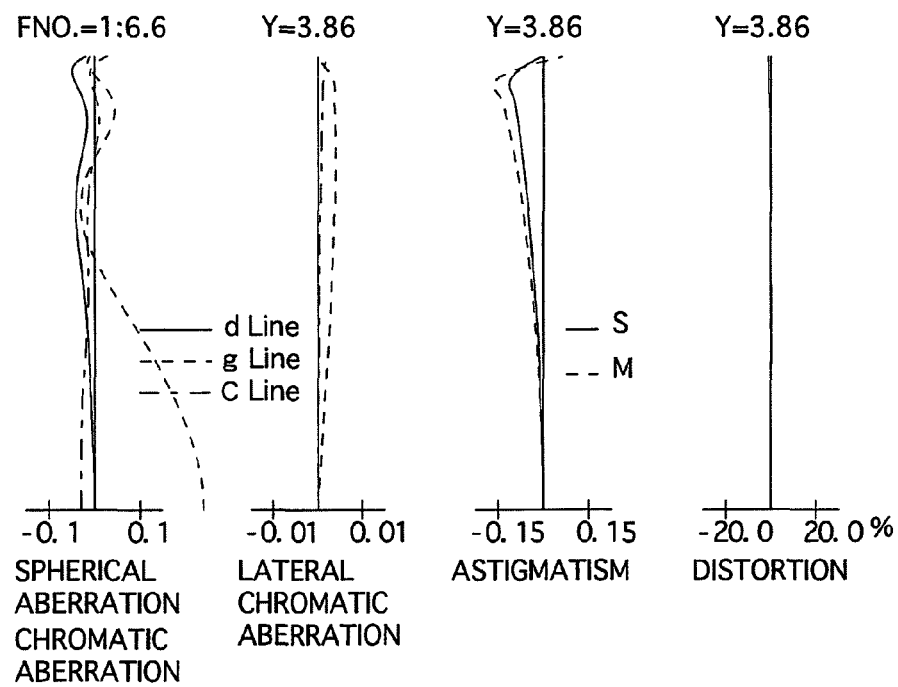

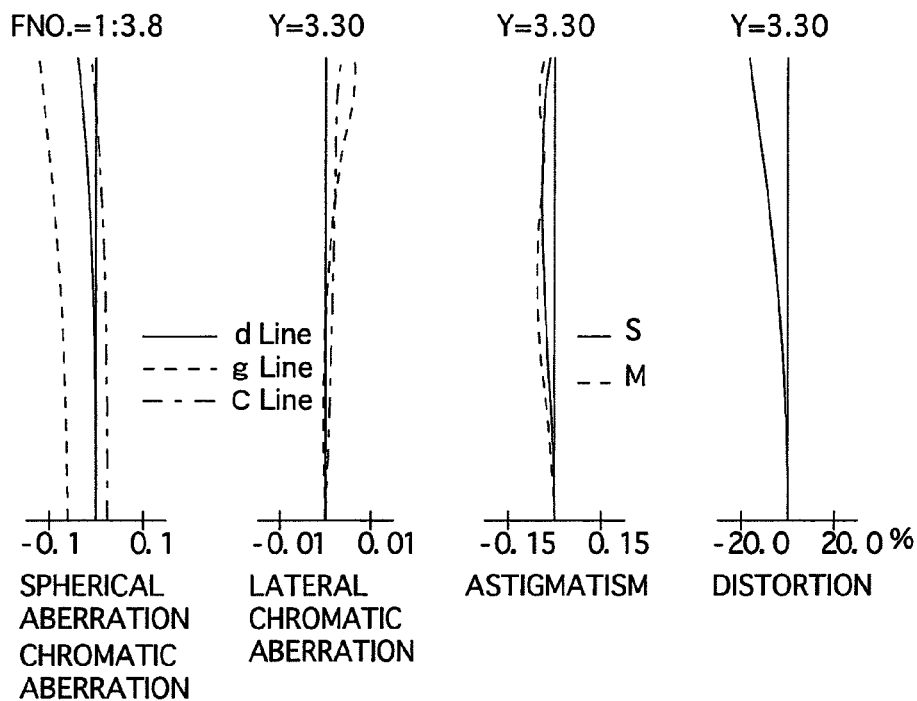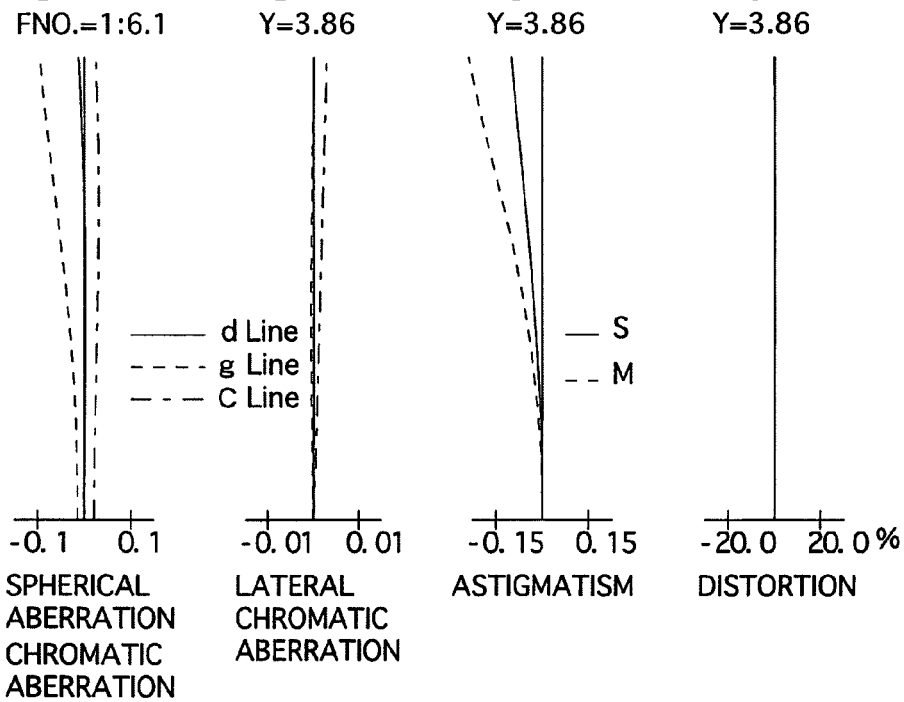

FNO.=1:6.6  Y=3.86  Y=3.86  Y=3.86

— d Line
--- g Line
-·- C Line

— S
--- M

-0.1  0.1    -0.01  0.01    -0.15  0.15    -20.0  20.0 %
SPHERICAL      LATERAL        ASTIGMATISM   DISTORTION
ABERRATION     CHROMATIC
CHROMATIC      ABERRATION
ABERRATION

ZOOM LENS SYSTEM AND ELECTRONIC IMAGING APPARATUS PROVIDED WITH THE SAME

BACKGROUND OF THE INVENTION

1. Field of the Invention

The present invention relates to a high zoom-ratio zoom lens system that is suitable mainly for use as an imaging optical system for an image sensor, and includes a wide angle range of a half angle-of-view of 35 degrees. The present invention also relates to an electronic imaging apparatus which uses such a zoom lens system.

2. Description of Related Art

In recent years there has been an increasing need for a zoom lens system in a compact digital camera to achieve a wider angle-of-view and a high zoom ratio. Whereas, further advancement in the miniaturization of the pixel pitch has occurred, thereby increasing the demand for the optical system to have a higher resolution. It is very common for imaging lens systems which are mainly used for compact digital cameras to achieve a slimmer camera body by employing a retractable mechanism that uses multi-stage barrels to reduce the air-distance between lens groups when the zoom lens system is fully retracted to the accommodated position. In order to achieve a miniaturized unit (camera body) when the zoom lens system has fully retracted, the zoom lens system is required to have thin lens groups (small dimensions in the optical axis direction) as well as the frontmost lens group having a small lens diameter. Furthermore, at the design stage, consideration needs to be given to mechanical restrictions in regard to the overall length of the zoom lens system.

Zoom lens systems configured of a negative first lens group, a positive second lens group, and a positive third lens group, in that order from the object side, i.e., three lens groups, are known to be used for compact digital cameras (Japanese Patent No. 4,189,257 and Japanese Unexamined Patent Publication Nos. 2009-37125 and 2004-258235).

However, in each of the zoom lens systems taught in the above-mentioned Japanese Patent No. 4,189,257 and Japanese Unexamined Patent Publication Nos. 2009-37125 and 2004-258235, the zoom ratio is only approximately 2:1 through 4:1, which does not satisfy the required zoom ratio specifications. Furthermore, since the zooming burden on the second lens group is low, so that the zooming burden on the other lens groups (mainly the third lens group) becomes excessively large, miniaturization (slimming down) of the zoom lens system becomes insufficient.

SUMMARY OF THE INVENTION

The present invention, which has been devised in view of the above-described problems, provides a miniaturized zoom lens system that achieves a high zoom-ratio of approximately 6:1 through 7:1, and achieves a wide angle-of-view of at least 70 degrees at the short focal length extremity.

According to an aspect of the present invention, a zoom lens system is provided, including a negative first lens group, a positive second lens group, and a positive third lens group, in that order from the object side, wherein upon zooming from the short focal length extremity to the long focal length extremity, the distance between the first lens group and the second lens group decreases and the distance between the second lens group and the third lens group changes, in the optical axis direction. The second lens group includes a biconvex positive lens element provided with an aspherical surface on each side thereof, and a negative meniscus lens element provided with an aspherical surface on at least one surface thereof and having a concave surface on the image side, in that order from the object side. The following condition (1) is satisfied:

$$5 < m2t/m2w < 8 \qquad (1),$$

wherein m2t designates the lateral magnification of the second lens group at the long focal length extremity when focused on an object at infinity, and m2w designates the lateral magnification of the second lens group at the short focal length extremity when focused on an object at infinity.

It is desirable for the first lens group to include a positive lens element that is provided closest to the image side therein, and wherein the following conditions (2) and (3) are satisfied:

$$-0.8 < F1/fa < -0.3 \qquad (2),$$

and $$-1.2 < F2/fb < -0.6 \qquad (3),$$

wherein F1 designates the focal length of the first lens group, fa designates the focal length of the positive lens element that is provided closest to the image side within the first lens group, F2 designates the focal length of the second lens group, and fb designates the focal length of the negative meniscus lens element that is provided closest to the image side within the second lens group.

It is desirable for the first lens group to have two lens elements, and wherein the following condition (4) is satisfied:

$$70 < va+vb \qquad (4),$$

wherein va designates the difference in Abbe number with respect to the d-line of the two lens elements provided in the first lens group, and vb designates the difference in Abbe number with respect to the d-line of the two lens elements provided in the second lens group.

It is desirable for the following condition (5) to be satisfied:

$$0.2 < t/Ft < 0.5 \qquad (5),$$

wherein t designates the total sum of the lens thickness of the first lens group, the second lens group and the third lens group, and Ft designates the focal length of the entire zoom lens system at the long focal length extremity.

It is desirable for the first lens group to include a negative lens element having a concave surface on the image side, and a positive lens element having a convex surface on the object side and provided with an aspherical surface on at least one side thereof, in that order from the object side.

It is desirable for each of the lens element that is provided closest to the image side within the first lens group and the lens element that is provided closest to the image side within the second lens group to be a plastic lens element.

In an embodiment, an electronic imaging apparatus is provided, including the above-described zoom lens system, and an image sensor which converts an image formed through the zoom lens system into electrical signals.

According to the present invention, a miniaturized zoom lens system is provided that achieves a high zoom-ratio of approximately 6:1 through 7:1, and achieves a wide angle-of-view of at least 70 degrees at the short focal length extremity.

The present disclosure relates to subject matter contained in Japanese Patent Application No. 2011-267861 (filed on Dec. 7, 2011) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first numerical embodiment of a zoom lens system, according to the present invention, at the short focal length extremity when focused on an object at infinity;

FIGS. 2A, 2B, 2C and 2D show various aberrations that occurred in the lens arrangement shown in FIG. 1, at the short focal length extremity when focused on an object at infinity;

FIGS. 3A, 3B, 3C and 3D show various aberrations that occurred in the lens arrangement shown in FIG. 1, at an intermediate focal length when focused on an object at infinity;

FIGS. 4A, 4B, 4C and 4D show various aberrations that occurred in the lens arrangement shown in FIG. 1, at the long focal length when focused on an object at infinity;

FIGS. 6A, 6B, 6C and 6D show various aberrations that occurred in the lens arrangement shown in FIG. 5, at the short focal length extremity when focused on an object at infinity;

FIGS. 7A, 7B, 7C and 7D show various aberrations that occurred in the lens arrangement shown in FIG. 5, at an intermediate focal length when focused on an object at infinity;

FIGS. 8A, 8B, 8C and 8D show various aberrations that occurred in the lens arrangement shown in FIG. 5, at the long focal length when focused on an object at infinity;

FIGS. 10A, 10B, 10C and 10D show various aberrations that occurred in the lens arrangement shown in FIG. 9, at the short focal length extremity when focused on an object at infinity;

FIGS. 11A, 11B, 11C and 11D show various aberrations that occurred in the lens arrangement shown in FIG. 9, at an intermediate focal length when focused on an object at infinity;

FIGS. 12A, 12B, 12C and 12D show various aberrations that occurred in the lens arrangement shown in FIG. 9, at the long focal length when focused on an object at infinity;

FIGS. 14A, 14B, 14C and 14D show various aberrations that occurred in the lens arrangement shown in FIG. 13, at the short focal length extremity when focused on an object at infinity;

FIGS. 15A, 15B, 15C and 15D show various aberrations that occurred in the lens arrangement shown in FIG. 13, at an intermediate focal length when focused on an object at infinity;

FIGS. 16A, 16B, 16C and 16D show various aberrations that occurred in the lens arrangement shown in FIG. 13, at the long focal length when focused on an object at infinity;

FIGS. 18A, 18B, 18C and 18D show various aberrations that occurred in the lens arrangement shown in FIG. 17, at the short focal length extremity when focused on an object at infinity;

FIGS. 19A, 19B, 19C and 19D show various aberrations that occurred in the lens arrangement shown in FIG. 17, at an intermediate focal length when focused on an object at infinity;

DESCRIPTION OF THE EMBODIMENTS

Figure 21:
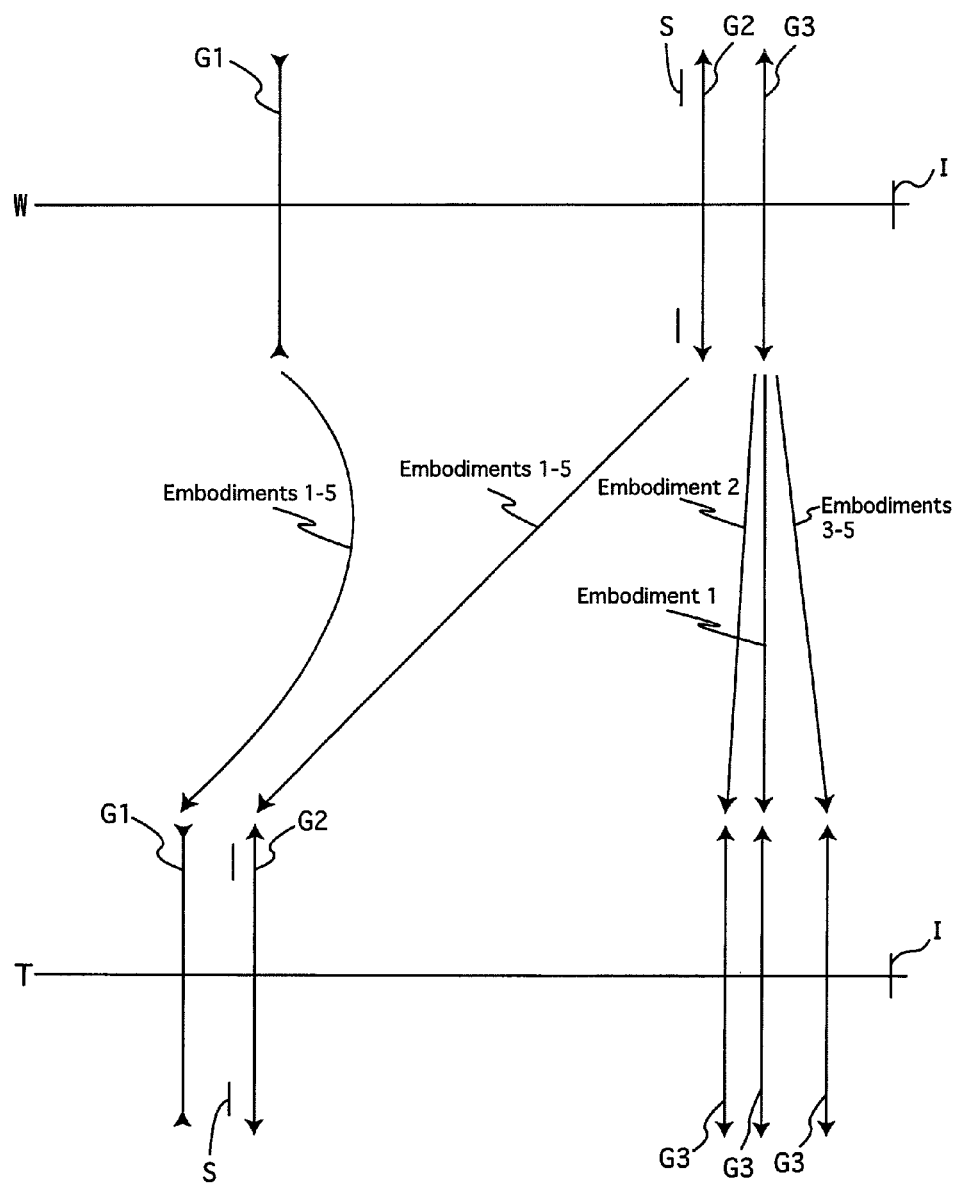
FIG. 21 shows a zoom path of the zoom lens system according to the present invention.

The zoom lens system according to the present invention, in each of the first through fifth numerical embodiments, is configured of a negative first lens group G1, a positive second lens group G2 and a positive third lens group G3, in that order from the object side, as shown in the zoom path of FIG. 21. A diaphragm S which is provided between the first lens group G1 and the second lens group G2 moves integrally with the second lens group G2 during a zooming operation. Focusing is carried out by moving the third lens group G3 in the optical axis direction (either toward the object side/the image side). "I" designates the imaging plane. In the illustrated embodiments, the zoom lens system forms an image onto an image sensor, and the imaging plane I coincides with (substantially lies on the same plane as) the image-receiving surface of this image sensor.

In each of the first through fifth numerical embodiments, the zoom lens system according to the present invention, upon zooming from the short focal length extremity (WIDE) to the long focal length extremity (TELE), moves each of the first through third lens groups G1 through G3 in the optical axis direction while decreasing the distance between the first and second lens groups G1 and G2, and increasing the distance between the second and third lens groups G2 and G3. For example, upon zooming from the short focal length extremity to the long focal length extremity, in the case where the third lens group G3 first moves toward the object side and thereafter moves back toward the image side (i.e., in the case where the third lens group G3 has a convex shaped movement path toward the object side), it is possible for the distance between the second lens group G2 and the third lens group G3 to first decrease and thereafter increase (i.e., it is possible for a zoom position to exist in which the distance between the second lens group G2 and the third lens group G3 is narrower (shorter) than that at the short focal length extremity).

More specifically, in each of the first through fifth numerical embodiments, the first lens group G1, upon zooming from the short focal length extremity to the long focal length extremity, first moves toward the image side and thereafter moves back toward the object side until a position that is closer to the object side than when the first lens group G1 is positioned at the short focal length extremity (so that the first lens group G1 moves toward the object side overall).

In each of the first through fifth numerical embodiments, the second lens group G2, during zooming from the short focal length extremity to the long focal length extremity, moves monotonically toward the object side.

The third lens group G3, upon zooming from the short focal length extremity to the long focal length extremity, moves negligibly in the first numerical embodiment, moves toward the object side in the second numerical embodiment, and moves toward the image side in the third through fifth numerical embodiments.

The second lens group G2 can be used as an image-shake correction lens group that corrects an image shake by being moved in directions orthogonal to the optical axis to change the imaging position thereof.

The first lens group G1 is configured of a biconcave negative lens element (a negative lens element having a concave surface on the image side) 11, and a positive meniscus lens element having a convex surface on the object side (a positive lens element having a convex surface on the object side) 12, in that order from the object side.

The biconcave negative lens element 11 is provided with an aspherical surface on each side thereof in the first through fourth numerical embodiments, and is provided with a spherical surface on each side thereof (i.e., is not an aspherical surfaced lens element) in the fifth numerical embodiment. However, the biconcave negative lens element 11 can alternatively be provided with an aspherical surface on only one side thereof. Furthermore, a negative meniscus lens element having a concave surface on the image side can be used instead of the biconcave negative lens element 11.

The positive meniscus lens element 12 is a plastic lens element provided with an aspherical surface on each side thereof. However, the positive meniscus lens element 12 can alternatively be provided with an aspherical surface on only one side thereof. Furthermore, the positive meniscus lens element 12 can be a glass-molded aspherical surfaced lens element, or a hybrid lens configured of a compound resin aspherical surface layer adhered to a glass lens element. Furthermore, a biconvex positive lens element can be used instead of the positive meniscus lens element 12.

The second lens group G2 is configured of a biconvex positive lens element 21 and a negative meniscus lens element 22 having a concave surface on the image side, in that order from the object side.

The biconvex positive lens element 21 is provided with an aspherical surface on each side thereof.

The negative meniscus lens element 22 is a plastic lens element provided with an aspherical surface on each side thereof. However, the negative meniscus lens element 22 can alternatively be provided with an aspherical surface on only one side thereof. Furthermore, the negative meniscus lens element 22 can be a glass-molded aspherical surfaced lens element, or a hybrid lens configured of a compound resin aspherical surface layer adhered to a glass lens element.

The third lens group G3 is configured of a biconvex positive single lens element 31. The biconvex positive single lens element 31 is provided with an aspherical surface on each side thereof.

In order to miniaturize a camera provided with a retractable zoom lens system that uses multi-stage barrels, it is important to reduce the diameter of the first lens group that is provided closest to the object side, and to reduce the thickness of each lens group. In order to increase the zoom ratio of the zoom lens system, increasing the number of lens groups is a conceivable option, however, since the number of lens elements also increases if the number of lens groups become large, the sum total of the thickness of all of the lens group becomes large. Furthermore, generally, if the number of lens elements of the zoom lens system are reduced, it becomes increasingly difficult to favorably correct aberrations. In order to favorably correct various aberrations over the entire zooming range while achieving miniaturization (slimming/reduction in length in the optical axis direction) of the zoom lens system, it is necessary to appropriately determine the lens arrangement and the distribution of the refractive power of each lens group.

The zoom lens system of the illustrated embodiment is configured of three lens groups, i.e., a negative lens group, a positive lens group and a positive lens group, in that order from the object side, and is a negative-lead zoom lens system that is suitable for use in a compact digital camera. Such a type of zoom lens system generally has the advantage of being able to reduce the diameter of the front lens group (first lens group) even in the case where a wide angle-of-view is achieved, however, it is difficult to achieve a high zoom ratio in such a zoom lens system. Furthermore, if attempts are made to achieve both a wide angle-of-view and a high zoom ratio, the number of lens elements easily increases and the effective light-bundle diameter easily increases, so that thickness of each lens group increases, and accordingly, a miniaturized (slimmed-down) optical unit (zoom lens system) cannot be achieved even when retracted to an accommodated position. Therefore, the zoom lens system is required to have as few number of lens elements in each lens group as possible while achieving both a high zoom ratio and miniaturization (slimming down) of the zoom lens system.

Whereas, in a zoom lens system configured of a negative lens group, a positive lens group and a positive lens group, in that order from the object side, in order to guarantee a superior optical capability, it is necessary to favorably correct various aberrations such as spherical aberration that occurs in the second lens group.

The zoom lens system of the present invention has decreased the thickness of the second lens group, thereby miniaturizing (slimming down) the zoom lens system, and favorably corrects various aberrations, such as spherical aberration, that occur in the second lens group by being configured of three lens groups, i.e., a negative lens group, a positive lens group and a positive lens group, in that order from the object side, in which the second lens group G2 is configured of the biconvex positive lens element 21 provided with an aspherical surface on each side, and a negative meniscus lens element 22 provided with an aspherical surface on each side and having a concave surface on the image side, in that order from the object side. However, the negative meniscus lens element 22 does not necessarily need to be provided with an aspherical surface on each side thereof; a given correction effect with respect to various aberrations can be achieved with the negative meniscus lens element 22 provided with an aspherical surface only on one side thereof.

Furthermore, the zoom lens system of the present invention achieves a superior optical capability by favorably correcting various aberrations such as spherical aberration while also achieving a higher zoom ratio and further miniaturization (slimming down) of the zoom lens system by appropriately setting the change in the lateral magnification of the second lens group G2 during zooming from the short focal length extremity to the long focal length extremity so as to satisfy condition (1).

If the upper limit of condition (1) is exceeded, it becomes difficult to correct various aberrations, such as spherical aberration, etc., that occur in the second lens group G2, so that the optical quality of the zoom lens system deteriorates.

If the lower limit of condition (1) is exceeded, since the zooming burden on the third lens group G3 becomes too large with respect to that of the second lens group G2, the amount of movement of the third lens group G3 along the optical axis during zooming increases, thereby increasing the size (overall length in the optical axis direction) of the zoom lens system. Furthermore, the height of the abaxial light rays incident on the third lens group G3 at the long focal length extremity increases, thereby increasing the fluctuation in the lens exit angle from the third lens group G3 and deteriorating the optical quality.

Condition (2) specifies the ratio of the focal length of the first lens group G1 to the focal length of the positive meniscus lens element 12 that is positioned closest to the image side within the first lens group G1. By satisfying condition (2), various aberrations, such as chromatic aberration, etc., can be favorably corrected with a small number of lens elements even if a plastic lens element is selected and used for the positive meniscus lens element 12.

If the upper limit of condition (2) is exceeded, the refractive power of the positive meniscus lens element 12 becomes too weak, so that in the case where a plastic lens element, which cannot be easily selected as a material having a low Abbe number (high-dispersion material), is used for the positive meniscus lens element 12, as in the illustrated embodiments, it becomes difficult to reduce chromatic aberration that occurs in the first lens group G1. In other words, although it is necessary to use a material having a low Abbe number in order to favorably correct chromatic aberrations with a low-powered lens element, there is little freedom in the selection of materials for the plastic lens element, so that it is difficult to select and use a plastic lens element having a low Abbe number. Therefore, if the refractive power of the positive meniscus lens element 12 become too weak, the correction of chromatic aberration becomes insufficient if the positive meniscus lens element 12 is configured of a plastic lens element.

If the lower limit of condition (2) is exceeded, the refractive power of the positive meniscus lens element 12 becomes too strong, so that the refractive power of the first lens group G1 weakens, and causes difficulties in providing a wide angle-of-view.

Condition (3) specifies the ratio of the focal length of the second lens group G2 to the focal length of the negative meniscus lens element 22 that is positioned closest to the image side within the second lens group G2. By satisfying condition (3), various aberrations, such as chromatic aberration, etc., can be favorably corrected with a small number of lens elements even if a plastic lens element is selected and used for the negative meniscus lens element 22.

If the upper limit of condition (3) is exceeded, the refractive power of the negative meniscus lens element 22 becomes too weak, so that in the case where a plastic lens element, which cannot be easily selected as a material having a low Abbe number (high-dispersion material), is used for the negative meniscus lens element 22, as in the illustrated embodiments, it becomes difficult to reduce chromatic aberration that occurs in the second lens group G2. In other words, although it is necessary to use a material having a low Abbe number in order to favorably correct chromatic aberrations with a low-powered lens element, there is little freedom in the selection of materials for the plastic lens element, so that it is difficult to select and use a plastic lens element having a low Abbe number. Therefore, if the refractive power of the negative meniscus lens element 22 becomes too weak, the correction of chromatic aberration becomes insufficient if the refractive power of the negative meniscus lens element 22 is configured of a plastic lens element.

If the lower limit of condition (3) is exceeded, the refractive power of the negative meniscus lens element 22 becomes too strong, the cancelling-out effect on various aberrations that occurs at the positive meniscus lens element (plastic lens element) 12 during changes in temperature, is reduced, thereby deteriorating the imaging quality at high and low temperatures.

In the illustrated embodiment of the zoom lens system, the first lens group G1 is configured of two lens elements (the biconcave negative lens element 11 and the positive meniscus lens element 12), and the second lens group G2 is also configured of two lens elements (the biconvex positive lens element 21 and the negative meniscus lens element 22). Condition (4), assuming such a lens configuration for the first and second lens groups G1 and G2, specifies the sum of the difference in Abbe number with respect to the d-line of the two lens elements that are provided in the first lens group Gl and the difference in Abbe number with respect to the d-line of the two lens elements that are provided in the second lens group G2. By satisfying condition (4), chromatic aberration can be favorably corrected within the first lens group G1 and the second lens group G2, so as to achieve a superior optical quality.

If the lower limit of condition (4) is exceeded, correction of chromatic aberration within the first lens group G1 and the second lens group G2 becomes difficult, so that the optical quality deteriorates.

Condition (5) specifies the ratio of the sum of the lens thickness of the first through third lens groups G1 through G3 (the total thickness at the center of the lens elements on the optical axis) to the focal length of the entire zoom lens system at the long focal length extremity. By satisfying condition (5), the zoom lens system can be miniaturized (slimmed down in the optical axis direction) while facilitating the manufacture of the zoom lens system and reducing the cost thereof.

If the upper limit of condition (5) is exceeded, the sum of the lens thickness of the first through third lens groups G1 through G3 with respect to the focal length of the entire zoom lens system at the long focal length extremity becomes too large, so that the length of the zoom lens system when retracted to the accommodated position increases, thereby making miniaturization (slimming down) thereof difficult.

If the lower limit of condition (5) is exceeded, the sum of the lens thickness of the first through third lens groups G1 through G3 with respect to the focal length of the entire zoom lens system at the long focal length extremity becomes too small, so that the difficulty in the manufacture of each lens element in the first through third lens groups G1 through G3 increases, thereby increasing the cost.

Specific numerical embodiments will be herein discussed. In the aberration diagrams and the tables, the d-line, g-line and C-line show aberrations at their respective wave-lengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The unit used for the various lengths is defined in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

FIGS. 1 through 4D and Tables 1 through 4 show a first numerical embodiment of a zoom lens system according to the present invention. FIG. 1 shows a lens arrangement of the first numerical embodiment of the zoom lens system at the short focal length extremity when focused on an object at infinity. FIGS. 2A, 2B, 2C and 2D show various aberrations that occurred in the lens arrangement shown in FIG. 1 at the short focal length extremity when focused on an object at infinity. FIGS. 3A, 3B, 3C and 3D show various aberrations that occurred in the lens arrangement shown in FIG. 1 at an intermediate focal length when focused on an object at infinity. FIGS. 4A, 4B, 4C and 4D show various aberrations that occurred in the lens arrangement shown in FIG. 1 at the long focal length extremity when focused on an object at infinity. Table 1 shows the lens surface data, Table 2 shows various zoom lens system data, Table 3 shows the aspherical surface data, and Table 4 shows the lens group data of the zoom lens system according to the first numerical embodiment.

The zoom lens system of the first numerical embodiment is configured of a negative first lens group G1, a positive second lens group G2 and a positive third lens group G3, in that order from the object side. A diaphragm S which is provided between the first lens group G1 and the second lens group G2 moves integrally with the second lens group G2 during zooming. An optical filter OP and a cover glass CG are disposed behind (between the biconvex positive single lens element 31 and the imaging plane I) the third lens group G3.

The first lens group G1 is configured of a biconcave negative lens element 11 and a positive meniscus lens element 12 having a convex surface on the object side, in that order from the object side. The biconcave negative lens element 11 is provided with an aspherical surface on each side thereof. The positive meniscus lens element 12 is a plastic lens element provided with an aspherical surface on each side thereof.

The second lens group G2 is configured of a biconvex positive lens element 21 and a negative meniscus lens element 22 having a concave surface on the image side, in that order from the object side. The biconvex positive lens element 21 is provided with an aspherical surface on each side thereof. The negative meniscus lens element 22 is a plastic lens element provided with an aspherical surface on each side thereof.

The third lens group G3 is configured of a biconvex positive single lens element 31. The biconvex positive single lens element 31 is provided with an aspherical surface on each side thereof.

TABLE 1

SURFACE DATA

| Surf. No. | r | d | Nd | vd |
|---|---|---|---|---|
| 1* | −27.097 | 0.650 | 1.76802 | 49.2 |
| 2* | 6.747 | 1.987 | | |
| 3* | 9.309 | 2.188 | 1.63548 | 23.9 |
| 4* | 29.934 | d4 | | |
| 5 (Diaphragm) | ∞ | 0.550 | | |
| 6* | 5.350 | 2.432 | 1.49710 | 81.6 |
| 7* | −9.889 | 0.050 | | |
| 8* | 8.343 | 2.137 | 1.63548 | 23.9 |
| 9* | 3.457 | d9 | | |
| 10* | 31.761 | 1.900 | 1.54358 | 55.7 |
| 11* | −17.471 | d11 | | |
| 12 | ∞ | 0.300 | 1.51680 | 64.2 |
| 13 | ∞ | 0.560 | | |
| 14 | ∞ | 0.500 | 1.51680 | 64.2 |
| 15 | ∞ | — | | |

The asterisk (*) designates an aspherical surface which is rotationally symmetrical with respect to the optical axis.

TABLE 2

ZOOM LENS SYSTEM DATA
Zoom Ratio 6.05

| | Short Focal Length Extremity | Intermediate Focal Length | Long Focal Length Extremity |
|---|---|---|---|
| FNO. | 3.5 | 5.6 | 6.6 |
| f | 4.18 | 10.48 | 25.32 |
| W | 43.2 | 20.3 | 8.6 |
| Y | 3.30 | 3.86 | 3.86 |
| fB | 0.59 | 0.59 | 0.59 |
| L | 40.05 | 34.24 | 47.17 |
| d4 | 19.588 | 6.049 | 0.741 |
| d9 | 3.081 | 10.841 | 29.020 |
| d11 | 3.409 | 3.374 | 3.439 |

TABLE 3

Aspherical Surface Data (the aspherical surface coefficients not indicated are zero (0.00)):

| Surf. No. | K | A4 | A6 | A8 | A10 |
|---|---|---|---|---|---|
| 1 | 0.000 | 0.8554E−03 | −0.1434E−04 | 0.7861E−07 | |
| 2 | 0.000 | −0.1314E−03 | 0.4080E−04 | −0.9891E−06 | 0.1228E−08 |
| 3 | 0.000 | −0.1024E−02 | 0.2519E−04 | −0.6169E−06 | 0.1172E−07 |
| 4 | 0.000 | −0.5198E−03 | 0.1388E−05 | −0.1124E−06 | 0.3584E−08 |
| 6 | −3.526 | 0.2131E−02 | −0.2085E−04 | −0.3156E−05 | |
| 7 | 0.000 | 0.2356E−02 | −0.1909E−03 | 0.4201E−05 | |
| 8 | 0.000 | 0.5387E−04 | −0.2597E−04 | −0.1342E−04 | 0.9144E−06 |
| 9 | 0.000 | −0.3227E−02 | 0.4794E−03 | −0.9257E−04 | 0.5208E−05 |
| 10 | 0.000 | 0.6914E−03 | −0.3220E−04 | 0.1737E−05 | −0.2837E−07 |
| 11 | 0.000 | 0.1081E−02 | −0.5843E−04 | 0.2968E−05 | −0.5178E−07 |

TABLE 4

LENS GROUP DATA

| Lens Group | 1st Surf | Focal Length |
|---|---|---|
| 1 | 1 | −11.91 |
| 2 | 6 | 10.76 |
| 3 | 10 | 21.02 |

Numerical Embodiment 2

Figure 5:
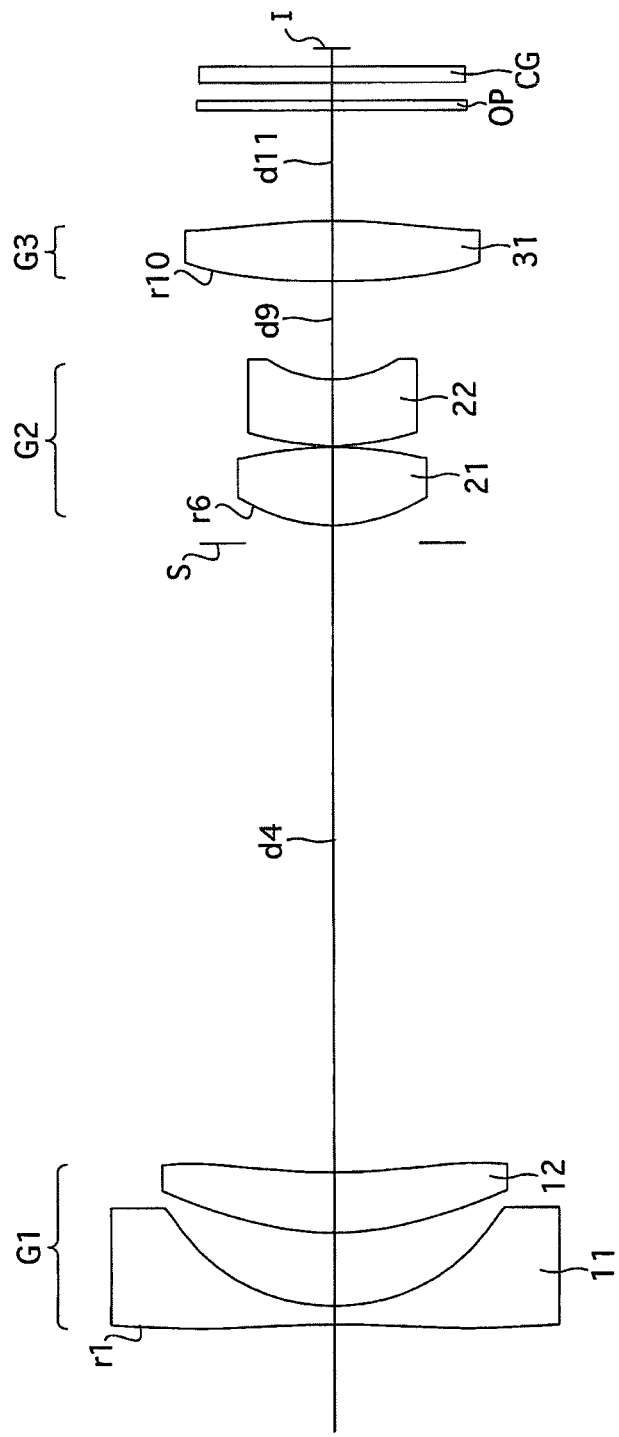
FIG. 5 shows a lens arrangement of a second numerical embodiment of a zoom lens system, according to the present invention, at the short focal length extremity when focused on an object at infinity.

FIGS. 5 through 8D and Tables 5 through 8 show a second numerical embodiment of a zoom lens system according to the present invention. FIG. 5 shows a lens arrangement of the second numerical embodiment of the zoom lens system at the short focal length extremity when focused on an object at infinity. FIGS. 6A, 6B, 6C and 6D show various aberrations that occurred in the lens arrangement shown in FIG. 5 at the short focal length extremity when focused on an object at infinity. FIGS. 7A, 7B, 7C and 7D show various aberrations that occurred in the lens arrangement shown in FIG. 5 at an intermediate focal length when focused on an object at infinity. FIGS. 8A, 8B, 8C and 8D show various aberrations that occurred in the lens arrangement shown in FIG. 5 at the long focal length extremity when focused on an object at infinity. Table 5 shows the lens surface data, Table 6 shows various zoom lens system data, Table 7 shows the aspherical surface data, and Table 8 shows the lens group data of the zoom lens system according to the second numerical embodiment.

The lens arrangement of the second numerical embodiment is the same as that of the first numerical embodiment.

TABLE 5

SURFACE DATA

| Surf. No. | r | d | N(d) | νd |
|---|---|---|---|---|
| 1* | −31.665 | 0.600 | 1.72916 | 54.7 |
| 2* | 6.449 | 2.272 | | |
| 3* | 8.859 | 1.902 | 1.63548 | 23.9 |
| 4* | 19.555 | d4 | | |
| 5 (Diaphragm) | ∞ | 0.550 | | |
| 6* | 5.300 | 2.468 | 1.49710 | 81.6 |
| 7* | −10.373 | 0.050 | | |
| 8* | 8.585 | 2.086 | 1.63548 | 23.9 |
| 9* | 3.623 | d9 | | |
| 10* | 33.384 | 1.900 | 1.54358 | 55.7 |
| 11* | −17.212 | d11 | | |
| 12 | ∞ | 0.300 | 1.51680 | 64.2 |
| 13 | ∞ | 0.560 | | |
| 14 | ∞ | 0.500 | 1.51680 | 64.2 |
| 15 | ∞ | — | | |

The asterisk (*) designates an aspherical surface which is rotationally symmetrical with respect to the optical axis.

TABLE 6

ZOOM LENS SYSTEM DATA
Zoom Ratio 6.05

| | Short Focal Length Extremity | Intermediate Focal Length | Long Focal Length Extremity |
|---|---|---|---|
| FNO. | 3.5 | 5.5 | 6.5 |
| f | 4.06 | 10.23 | 24.55 |
| W | 44.3 | 20.8 | 8.9 |
| Y | 3.30 | 3.86 | 3.86 |
| fB | 0.59 | 0.59 | 0.59 |
| L | 40.14 | 34.36 | 47.73 |
| d4 | 19.783 | 6.220 | 0.911 |
| d9 | 3.095 | 10.855 | 29.033 |
| d11 | 3.444 | 3.474 | 3.979 |

TABLE 7

Aspherical Surface Data (the aspherical surface coefficients not indicated are zero (0.00)):

| Surf. No. | K | A4 | A6 | A8 | A10 |
|---|---|---|---|---|---|
| 1 | 0.000 | 0.6733E−03 | −0.9457E−05 | 0.4566E−07 | |
| 2 | 0.000 | −0.2616E−03 | 0.2795E−04 | −0.1254E−06 | −0.1183E−07 |
| 3 | 0.000 | −0.9609E−03 | 0.2173E−05 | 0.7660E−06 | −0.1606E−07 |
| 4 | 0.000 | −0.5727E−03 | −0.9279E−05 | 0.7873E−06 | −0.1704E−07 |
| 6 | −4.004 | 0.2546E−02 | −0.5515E−04 | −0.1155E−05 | |
| 7 | 0.000 | 0.2011E−02 | −0.1536E−03 | 0.3508E−05 | |
| 8 | 0.000 | 0.6914E−04 | −0.3458E−04 | −0.8442E−05 | 0.5878E−06 |
| 9 | 0.000 | −0.2451E−02 | 0.4014E−03 | −0.7051E−04 | 0.3980E−05 |
| 10 | 0.000 | 0.7746E−03 | −0.3658E−04 | 0.1756E−05 | −0.2728E−07 |
| 11 | 0.000 | 0.1183E−02 | −0.6004E−04 | 0.2729E−05 | −0.4476E−07 |

TABLE 8

LENS GROUP DATA

| Lens Group | 1st Surf. | Focal Length |
|---|---|---|
| 1 | 1 | −11.52 |
| 2 | 6 | 10.73 |
| 3 | 10 | 21.17 |

Numerical Embodiment 3

Figure 9:
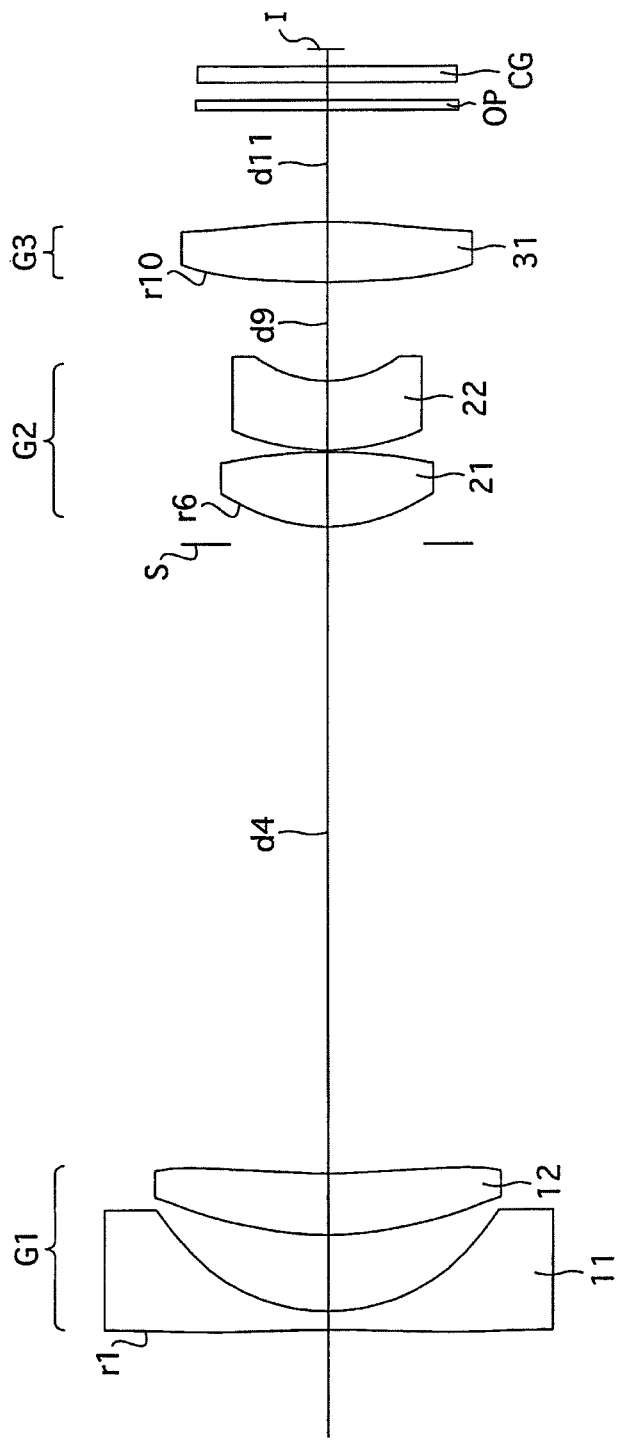
FIG. 9 shows a lens arrangement of a third numerical embodiment of a zoom lens system, according to the present invention, at the short focal length extremity when focused on an object at infinity.

FIGS. 9 through 12D and Tables 9 through 12 show a third numerical embodiment of a zoom lens system according to the present invention. FIG. 9 shows a lens arrangement of the third numerical embodiment of the zoom lens system at the short focal length extremity when focused on an object at infinity. FIGS. 10A, 10B, 10C and 10D show various aberrations that occurred in the lens arrangement shown in FIG. 9 at the short focal length extremity when focused on an object at infinity. FIGS. 11A, 11B, 11C and 11D show various aberrations that occurred in the lens arrangement shown in FIG. 9 at an intermediate focal length when focused on an object at infinity. FIGS. 12A, 12B, 12C and 12D show various aberrations that occurred in the lens arrangement shown in FIG. 9 at the long focal length extremity when focused on an object at infinity. Table 9 shows the lens surface data, Table 10 shows various zoom lens system data, Table 11 shows the aspherical surface data, and Table 12 shows the lens group data of the zoom lens system according to the third numerical embodiment.

The lens arrangement of the third numerical embodiment is the same as that of the first numerical embodiment.

TABLE 9

SURFACE DATA

| Surf. No. | r | d | N(d) | νd |
|---|---|---|---|---|
| 1* | −46.234 | 0.600 | 1.72916 | 54.7 |
| 2* | 6.158 | 2.401 | | |
| 3* | 10.569 | 1.922 | 1.63548 | 23.9 |
| 4* | 26.762 | d4 | | |
| 5 (Diaphragm) | ∞ | 0.550 | | |
| 6* | 5.510 | 2.363 | 1.49710 | 81.6 |
| 7* | −13.613 | 0.050 | | |
| 8* | 7.409 | 2.163 | 1.64150 | 19.0 |
| 9* | 3.729 | d9 | | |
| 10* | 34.624 | 1.900 | 1.54358 | 55.7 |
| 11* | −17.072 | d11 | | |
| 12 | ∞ | 0.300 | 1.51680 | 64.2 |
| 13 | ∞ | 0.560 | | |
| 14 | ∞ | 0.500 | 1.51680 | 64.2 |
| 15 | ∞ | — | | |

The asterisk (*) designates an aspherical surface which is rotationally symmetrical with respect to the optical axis.

TABLE 10

ZOOM LENS SYSTEM DATA
Zoom Ratio 6.80

| | Short Focal Length Extremity | Intermediate Focal Length | Long Focal Length Extremity |
|---|---|---|---|
| FNO. | 3.6 | 6.3 | 6.6 |
| f | 4.00 | 11.99 | 27.20 |
| W | 44.7 | 17.8 | 8.1 |
| Y | 3.30 | 3.86 | 3.86 |
| fB | 0.59 | 0.59 | 0.59 |
| L | 40.27 | 35.45 | 49.50 |
| d4 | 19.728 | 4.665 | 0.732 |
| d9 | 3.124 | 13.282 | 32.446 |
| d11 | 3.484 | 3.576 | 2.386 |

TABLE 11

Aspherical Surface Data (the aspherical surface coefficients not indicated are zero (0.00)):

| Surf. No. | K | A4 | A6 | A8 | A10 |
|---|---|---|---|---|---|
| 1 | 0.000 | 0.5253E−03 | −0.8144E−05 | 0.3888E−07 | |
| 2 | 0.000 | −0.1568E−03 | 0.1473E−04 | 0.6298E−06 | −0.3613E−07 |
| 3 | 0.000 | −0.7426E−03 | 0.5422E−05 | 0.1027E−05 | −0.2746E−07 |
| 4 | 0.000 | −0.6045E−03 | 0.3726E−06 | 0.5781E−06 | −0.1744E−07 |
| 6 | −4.281 | 0.2505E−02 | −0.7799E−04 | 0.1040E−05 | |
| 7 | 0.000 | 0.1134E−02 | −0.8692E−04 | 0.2121E−05 | |
| 8 | 0.000 | 0.1193E−03 | −0.1145E−04 | −0.5056E−05 | 0.2107E−06 |
| 9 | 0.000 | −0.1005E−02 | 0.3157E−03 | −0.5162E−04 | 0.2334E−05 |
| 10 | 0.000 | 0.6925E−03 | −0.2286E−04 | 0.1024E−05 | −0.1289E−07 |
| 11 | 0.000 | 0.1052E−02 | −0.3954E−04 | 0.1635E−05 | −0.2319E−07 |

TABLE 12

LENS GROUP DATA

| Lens Group | 1st Surf. | Focal Length |
|---|---|---|
| 1 | 1 | −11.36 |
| 2 | 6 | 10.75 |
| 3 | 10 | 21.31 |

Numerical Embodiment 4

Figure 13:
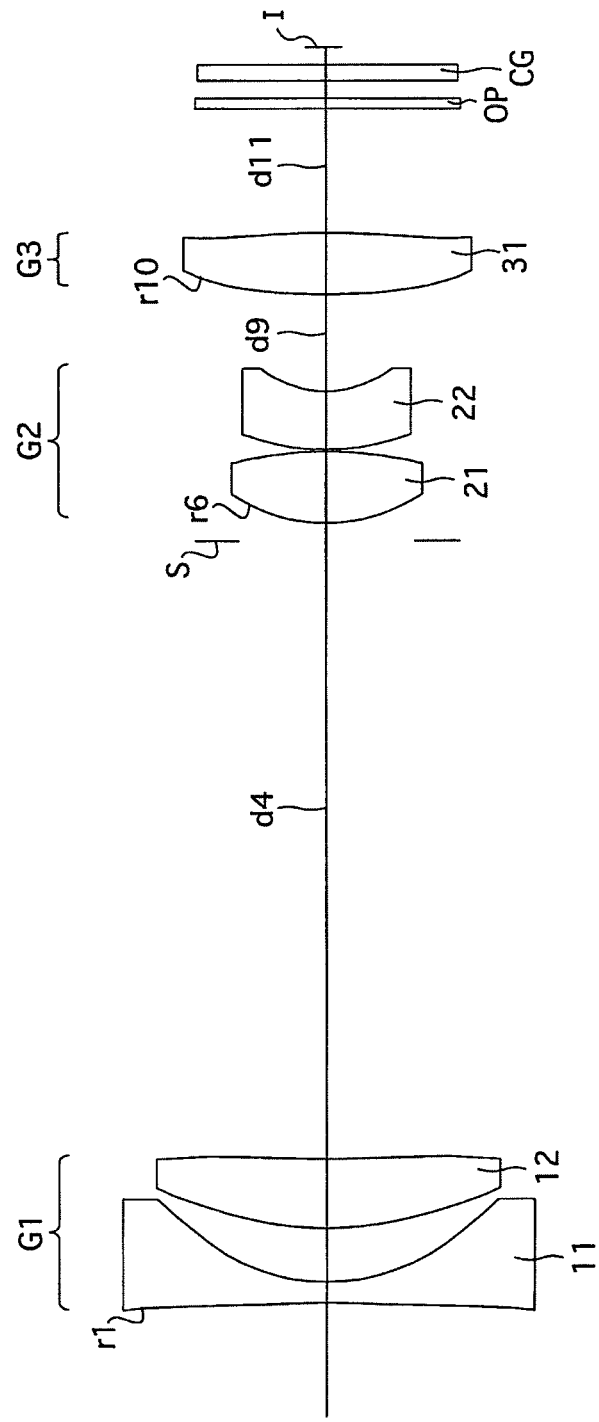
FIG. 13 shows a lens arrangement of a fourth numerical embodiment of a zoom lens system, according to the present invention, at the short focal length extremity when focused on an object at infinity.

FIGS. 13 through 16D and Tables 13 through 16 show a fourth numerical embodiment of a zoom lens system according to the present invention. FIG. 13 shows a lens arrangement of the fourth numerical embodiment of the zoom lens system at the short focal length extremity when focused on an object at infinity. FIGS. 14A, 14B, 14C and 14D show various aberrations that occurred in the lens arrangement shown in FIG. 13 at the short focal length extremity when focused on an object at infinity. FIGS. 15A, 15B, 15C and 15D show various aberrations that occurred in the lens arrangement shown in FIG. 13 at an intermediate focal length when focused on an object at infinity. FIGS. 16A, 16B, 16C and 16D show various aberrations that occurred in the lens arrangement shown in FIG. 13 at the long focal length extremity when focused on an object at infinity. Table 13 shows the lens surface data, Table 14 shows various zoom lens system data, Table 15 shows the aspherical surface data, and Table 16 shows the lens group data of the zoom lens system according to the fourth numerical embodiment.

The lens arrangement of the fourth numerical embodiment is the same as that of the first numerical embodiment.

TABLE 13

SURFACE DATA

| Surf. No. | r | d | N(d) | vd |
|---|---|---|---|---|
| 1* | −40.448 | 0.650 | 1.76802 | 49.2 |
| 2* | 6.825 | 1.660 | | |
| 3* | 10.108 | 2.180 | 1.63548 | 23.9 |
| 4* | 43.316 | d4 | | |
| 5 (Diaphragm) | ∞ | 0.550 | | |
| 6* | 5.221 | 2.250 | 1.49710 | 81.6 |
| 7* | −10.653 | 0.050 | | |

TABLE 13-continued

SURFACE DATA

| Surf. No. | r | d | N(d) | vd |
|---|---|---|---|---|
| 8* | 6.940 | 1.830 | 1.63548 | 23.9 |
| 9* | 3.140 | d9 | | |
| 10* | 24.000 | 1.900 | 1.54358 | 55.7 |
| 11* | −23.407 | d11 | | |
| 12 | ∞ | 0.300 | 1.51680 | 64.2 |
| 13 | ∞ | 0.560 | | |
| 14 | ∞ | 0.500 | 1.51680 | 64.2 |
| 15 | ∞ | — | | |

The asterisk (*) designates an aspherical surface which is rotationally symmetrical with respect to the optical axis.

TABLE 14

ZOOM LENS SYSTEM DATA
Zoom Ratio 5.79

| | Short Focal Length Extremity | Intermediate Focal Length | Long Focal Length Extremity |
|---|---|---|---|
| FNO. | 3.6 | 5.8 | 6.6 |
| f | 4.70 | 11.99 | 27.20 |
| W | 39.6 | 18.0 | 8.6 |
| Y | 3.30 | 3.86 | 3.86 |
| fB | 0.59 | 0.59 | 0.59 |
| L | 39.65 | 34.09 | 45.30 |
| d4 | 19.413 | 5.425 | 0.670 |
| d9 | 3.063 | 11.621 | 28.999 |
| d11 | 3.894 | 3.771 | 2.350 |

TABLE 15

Aspherical Surface Data (the aspherical surface coefficients not indicated are zero (0.00)):

| Surf. No. | K | A4 | A6 | A8 | A10 |
|---|---|---|---|---|---|
| 1 | 0.000 | 0.6857E−03 | −0.1785E−04 | 0.1337E−06 | |
| 2 | 0.000 | 0.1245E−04 | 0.4332E−04 | −0.2496E−05 | 0.2846E−07 |
| 3 | 0.000 | −0.8584E−03 | 0.5265E−04 | −0.2358E−05 | 0.3757E−07 |
| 4 | 0.000 | −0.5578E−03 | 0.2103E−04 | −0.1279E−05 | 0.2561E−07 |
| 6 | −3.086 | 0.2039E−02 | 0.4064E−05 | −0.6349E−05 | |
| 7 | 0.000 | 0.2608E−02 | −0.2719E−03 | 0.6875E−05 | |
| 8 | 0.000 | −0.3757E−03 | −0.1586E−04 | −0.2524E−04 | 0.1921E−05 |
| 9 | 0.000 | −0.4773E−02 | 0.5929E−03 | −0.1468E−03 | 0.8453E−05 |
| 10 | 0.000 | 0.7000E−03 | −0.2357E−04 | 0.9282E−06 | 0.2171E−08 |
| 11 | 0.000 | 0.9883E−03 | −0.4392E−04 | 0.1502E−05 | 0.1053E−08 |

TABLE 16

LENS GROUP DATA

| Lens Group | 1st Surf. | Focal Length |
|---|---|---|
| 1 | 1 | −13.47 |
| 2 | 6 | 11.21 |
| 3 | 10 | 22.11 |

Numerical Embodiment 5

Figure 17:
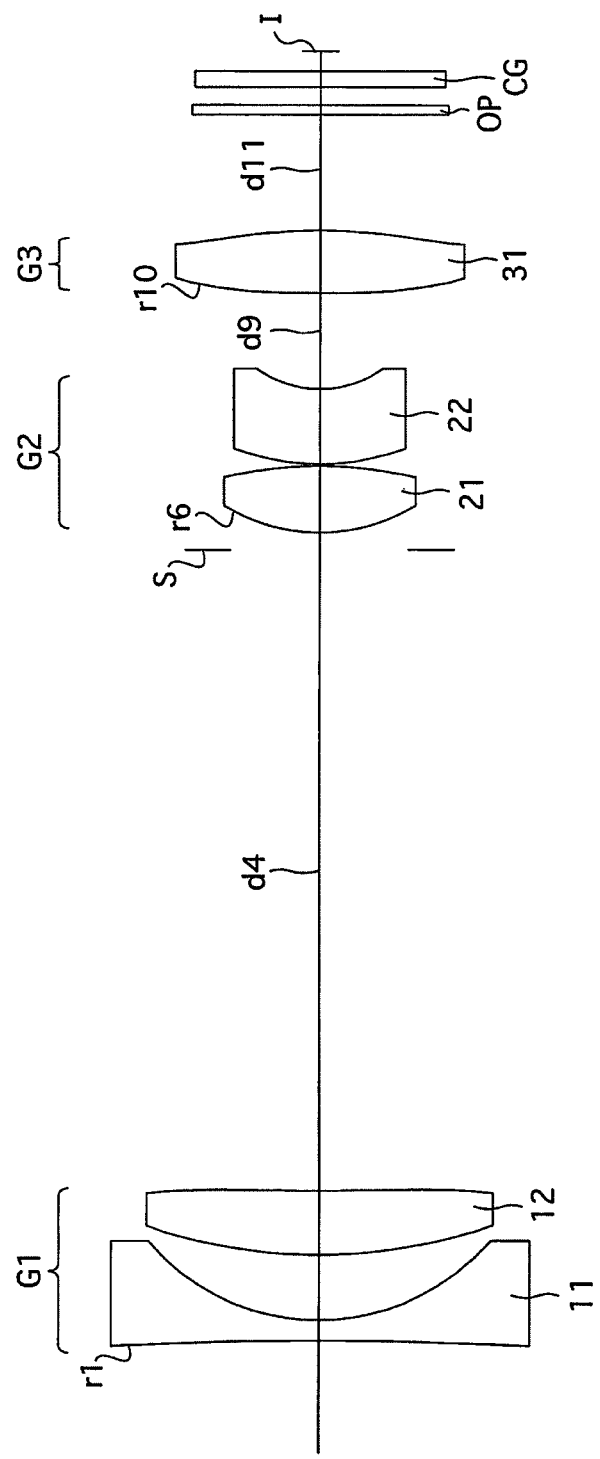
FIG. 17 shows a lens arrangement of a fifth numerical embodiment of a zoom lens system, according to the present invention, at the short focal length extremity when focused on an object at infinity.
Figure 20A:
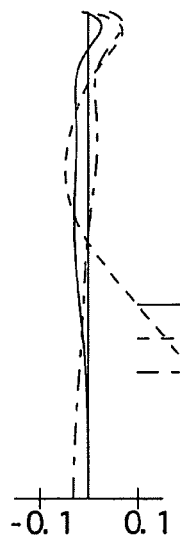
FIGS. 20A, 20B, 20C and 20D show various aberrations that occurred in the lens arrangement shown in FIG. 17, at the long focal length when focused on an object at infinity.
Figure 20B:
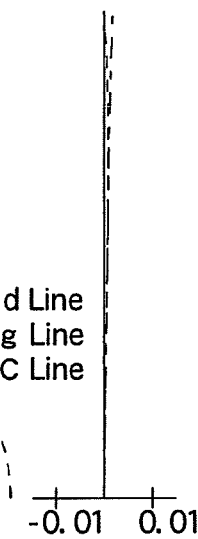
Figure 20C:
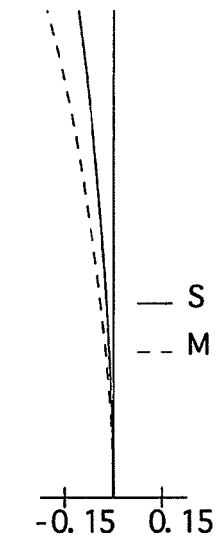
Figure 20D:
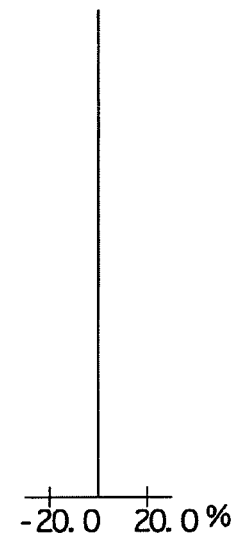

FIGS. 17 through 20D and Tables 17 through 20 show a fifth numerical embodiment of a zoom lens system according to the present invention. FIG. 17 shows a lens arrangement of the fifth numerical embodiment of the zoom lens system at the short focal length extremity when focused on an object at infinity. FIGS. 18A, 18B, 18C and 18D show various aberrations that occurred in the lens arrangement shown in FIG. 17 at the short focal length extremity when focused on an object at infinity. FIGS. 19A, 19B, 19C and 19D show various aberrations that occurred in the lens arrangement shown in FIG. 17 at an intermediate focal length when focused on an object at infinity. FIGS. 20A, 20B, 20C and 20D show various aberrations that occurred in the lens arrangement shown in FIG. 17 at the long focal length extremity when focused on an object at infinity. Table 17 shows the lens surface data, Table 18 shows various zoom lens system data, Table 19 shows the aspherical surface data, and Table 20 shows the lens group data of the zoom lens system according to the fifth numerical embodiment.

The lens arrangement of the fifth numerical embodiment is the same as that of the first numerical embodiment except for the biconcave negative lens element 11 of the first lens group G1 being provided with a spherical surface on each side (rather than an aspherical surface).

TABLE 17

SURFACE DATA

| Surf. No. | r | d | N(d) | vd |
|---|---|---|---|---|
| 1 | −133.490 | 0.650 | 1.72916 | 54.7 |
| 2 | 7.232 | 2.049 | | |
| 3* | 15.956 | 2.000 | 1.63548 | 23.9 |
| 4* | 63.854 | d4 | | |
| 5 (Diaphragm) | ∞ | 0.550 | | |
| 6* | 5.819 | 2.102 | 1.49710 | 81.6 |
| 7* | −10.311 | 0.050 | | |
| 8* | 7.235 | 2.380 | 1.63548 | 23.9 |
| 9* | 3.152 | d9 | | |
| 10* | 36.128 | 1.980 | 1.54358 | 55.7 |
| 11* | −15.359 | d11 | | |
| 12 | ∞ | 0.300 | 1.51680 | 64.2 |
| 13 | ∞ | 0.560 | | |
| 14 | ∞ | 0.500 | 1.51680 | 64.2 |
| 15 | ∞ | — | | |

The asterisk (*) designates an aspherical surface which is rotationally symmetrical with respect to the optical axis.

TABLE 18

ZOOM LENS SYSTEM DATA
Zoom Ratio 5.80

| | Short Focal Length Extremity | Intermediate Focal Length | Long Focal Length Extremity |
|---|---|---|---|
| FNO. | 3.8 | 6.1 | 6.6 |
| f | 4.80 | 12.00 | 27.82 |
| W | 39.5 | 17.9 | 7.9 |
| Y | 3.30 | 3.86 | 3.86 |
| fB | 0.59 | 0.59 | 0.59 |
| L | 40.70 | 34.54 | 45.70 |
| d4 | 20.154 | 5.966 | 0.670 |
| d9 | 3.013 | 11.269 | 28.488 |
| d11 | 3.622 | 3.396 | 2.630 |

TABLE 19

Aspherical Surface Data (the aspherical surface coefficients not indicated are zero(0.00)):

| Surf. No. | K | A4 | A6 | A8 | A10 |
|---|---|---|---|---|---|
| 3 | 0.000 | −0.7607E−04 | −0.8442E−05 | 0.3249E−06 | −0.1153E−08 |
| 4 | 0.000 | −0.3042E−03 | −0.8167E−05 | 0.3862E−06 | −0.5089E−08 |
| 6 | 1.092 | −0.7932E−03 | −0.2081E−04 | −0.5266E−05 | |
| 7 | 0.000 | 0.3055E−02 | −0.3256E−03 | 0.1350E−04 | |
| 8 | 0.000 | 0.1693E−05 | −0.7292E−04 | −0.1479E−04 | 0.1270E−05 |
| 9 | 0.329 | −0.6316E−02 | 0.3471E−03 | −0.1236E−03 | −0.1490E−05 |
| 10 | 0.000 | 0.3700E−03 | 0.4559E−05 | −0.3505E−06 | 0.1265E−07 |
| 11 | 0.000 | 0.5907E−03 | 0.2195E−05 | −0.4946E−06 | 0.1702E−07 |

TABLE 20

LENS GROUP DATA

| Lens Group | 1st Surf. | Focal Length |
|---|---|---|
| 1 | 1 | −14.14 |
| 2 | 6 | 11.30 |
| 3 | 10 | 20.10 |

The numerical values of each condition for each embodiment are shown in Table 21.

TABLE 21

| | Embod. 1 | Embod. 2 | Embod. 3 | Embod. 4 | Embod. 5 |
|---|---|---|---|---|---|
| Cond. (1) | 6.063 | 6.255 | 6.352 | 5.270 | 5.429 |
| Cond. (2) | −0.583 | −0.483 | −0.432 | −0.666 | −0.429 |
| Cond. (3) | −0.962 | −0.910 | −0.707 | −1.010 | −0.994 |
| Cond. (4) | 83.0 | 88.4 | 93.3 | 83.0 | 88.4 |
| Cond. (5) | 0.448 | 0.459 | 0.419 | 0.387 | 0.400 |

As can be understood from Table 21, the first through fifth embodiments satisfy conditions (1) through (5). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, and a positive third lens group, in that order from the object side, wherein upon zooming from the short focal length extremity to the long focal length extremity, the distance between said first lens group and said second lens group decreases and the distance between said second lens group and said third lens group changes, in the optical axis direction, wherein said second lens group comprises a biconvex positive lens element provided with an aspherical surface on each side thereof, and a negative meniscus lens element provided with an aspherical surface on at least one surface thereof and having a concave surface on the image side, in that order from the object side, and wherein the following condition (1) is satisfied:

$$5 < m2t/m2w < 8 \tag{1}$$

wherein m2t designates the lateral magnification of said second lens group at the long focal length extremity when focused on an object at infinity, and m2w designates the lateral magnification of said second lens group at the short focal length extremity when focused on an object at infinity.

2. The zoom lens system according to claim 1, wherein said first lens group comprises a positive lens element that is provided closest to the image side therein, and wherein the following conditions (2) and (3) are satisfied:

$$-0.8 < F1/fa < -0.3 \tag{2}$$

and $$-1.2 < F2/fb < -0.6, \tag{3}$$

wherein

F1 designates the focal length of said first lens group, fa designates the focal length of the positive lens element that is provided closest to the image side within said first lens group, F2 designates the focal length of said second lens group, and fb designates the focal length of the negative meniscus lens element that is provided closest to the image side within said second lens group.

3. The zoom lens system according to claim 1, wherein said first lens group is comprised of two lens elements, and wherein the following condition (4) is satisfied:

$$70 < \nu a + \nu b \tag{4},$$

wherein

νa designates the difference in Abbe number with respect to the d-line of the two lens elements provided in said first lens group, and νb designates the difference in Abbe number with respect to the d-line of the two lens elements provided in said second lens group.

4. The zoom lens system according to claim 1, wherein the following condition (5) is satisfied:

$$0.2 < t/Ft < 0.5 \tag{5},$$

wherein t designates the total sum of the lens thickness of said first lens group, said second lens group and said third lens group, and Ft designates the focal length of the entire zoom lens system at the long focal length extremity.

5. The zoom lens system according to claim 1, wherein said first lens group comprises a negative lens element having a concave surface on the image side, and a positive lens element having a convex surface on the object side and provided with an aspherical surface on at least one side thereof, in that order from the object side.

6. The zoom lens system according to claim 1, wherein each of the lens element that is provided closest to the image side within said first lens group and the lens element that is provided closest to the image side within said second lens group is a plastic lens element.

7. An electronic imaging apparatus comprising:
said zoom lens system according to claim 1; and
an image sensor which converts an image formed through said zoom lens system into electrical signals.

* * * * *